Patented Apr. 16, 1935

1,997,866

UNITED STATES PATENT OFFICE 1,997,866

METHOD OF PREPARING GRATED CHEESE PRODUCTS

Robert Roy Irvin, Milwaukee, Wis., assignor, by mesne assignments, to Davis Cheese Company, a corporation of Delaware No Drawing. Application September 8, 1930, Serial No. 480,613

4 Claims. (Cl. 99—11)

This invention relates to a method of preparing a dry powdered or grated cheese product.

Heretofore the best grated cheese products have been obtained only through a long process of ageing certain types of hard cheese, such as Italian hard cheese, under special conditions. The object of the present invention is to provide a simple and efficient method for preparing dry powdered or grated cheese products from hard cheeses of the Cheddar or similar types whether such cheese products consist of plain cheese, processed cheese or processed cheese with other dairy products added thereto.

It is well known that when Cheddar cheese or similar hard cheeses, containing about 50% fat (dry basis) are dried by ordinary means and without special pretreatment, the fat tends to separate as drying proceeds. According to the present invention this difficulty has been overcome and a satisfactory grated or powdered cheese product produced by first subjecting the cheese to high pressure emulsification in an homogenizer or similar apparatus followed by the drying of the emulsified product at relatively low temperatures and then pulverizing the dried product to form the finished product.

According to the present invention the first step consists in so finely dividing the fat globules of cheese and improving its emulsification that little or no fat separates when the mass is later dried. Experimentation has shown that Cheddar cheese, previously diluted with water and warmed, can be homogenized at high pressure (3,000 to 4,000 or more pounds) and then dried and ground into a satisfactory powdered cheese while the same cheese mixture dried without homogenization shows oiliness to a degree that makes it unsalable. I have further found that so-called process cheese with a fat content of 40% or more (dry basis) and containing other dairy products, or emulsifying salts, or both, can be treated by the present method and dried in a highly satisfactory manner though strong fat separation occurred when such products were dried without the treatment described herein.

The high pressure emulsification of dairy products such as ice-cream is not new. The process has also been employed to improve the fat dispersion in salad dressing. Cream cheese and other cheese mixtures have been similarly treated to increase the body and produce smoothness of texture, but so far as I am aware, the treatment of hard cheeses by emulsification for the purpose of making a satisfactory grated cheese product is new and permits the production of such a product on a commercially practical manufacturing basis.

My process or method consists in sufficiently diluting with water the cheese containing mass and warming the same so that it will easily pass through an homogenizer, viscolizer, colloid mill, or similar machine, which machines will be hereinafter designated as homogenizers, thus breaking up the contained fat globules into a fine state of subdivision uniformly distributed throughout the mass and improving the emulsification to a notable degree, then drying the mass by any convenient and suitable method and then grinding or otherwise pulverizing or comminuting the dried mass. It is to be noted that there is a greater shearing effect on the mass when using a colloid mill than with a valved type homogenizer. Drying may be done in thin layers at room, or somewhat elevated temperatures, and at either atmospheric or reduced pressures. For example, I have used temperatures ranging from 70° to 120° F. at atmospheric pressure. Drying has been done in vacuum at about 120° to 130° F. with excellent results. Drying has also been effected in a cold room at about 40° Fahrenheit. It is also to be noted that the treated cheese may be dried mechanically as in a vacuum spray drier or vacuum drum drier. It is understood that the subdividing of the fat globules in the cheese mass and improvement of the emulsion may be obtained not only by the types of machines mentioned above but by any other means or devices that disperse and break up the fat globules or particles in the cheese product being treated and improve the emulsion to at least an equal degree. The amount of diluting liquid (water for example) and the temperature used at emulsification are controlled only by the conditions that will give the best emulsification of the cheese mass by the particular machine used.

The following is a specific example of how my process may be carried out:

Two hundred and twenty parts of American Cheddar cheese are gradually mixed with one hundred parts of water under mechanical stirring and the temperature gradually raised to 55 to 65 degrees centigrade. The mass is then passed through the homogenizer once at low pressure (one thousand pounds per square inch). It is next given a second treatment at high pressure, the first valve of the homogenizer being set at five hundred pounds and the second at three thousand to thirty-five hundred pounds, the total pressure thus being thirty-five hundred to four thousand pounds per square inch. The mass is then dried quickly in thin layers either in vacuum of for example twenty to twenty-seven inches, or at atmospheric pressure in a current of air at room or slightly elevated temperatures. The dried product is thereafter finely pulverized and may then be placed in air tight containers of any suitable description.

Process cheese, with or without other added dairy products, may be treated and dried in the same manner as plain cheese described above except that in this case the amount of water required for dilution is less. While the invention described above has been set forth in specific detail, it is understood that various reasonable modifications may be made without departing from the invention as devised by the hereunto appended claims.

What I claim as my invention is:

1. That improvement in the art of drying cheese, which comprises adding to the cheese a substantial quantity of aqueous fluid, heating and homogenizing the same, so as to render it of a relatively thin, smooth and homogeneous consistency, and drying the fluid mass thus produced.

2. That improvement in the art of drying cheese, which comprises adding to the cheese a substantial quantity of aqueous fluid, heating and homogenizing the same, so as to render it of a relatively thin, smooth and homogeneous consistency, drying the fluid mass thus produced, and then comminuting the dried product.

3. That improvement in the art of drying cheese, which comprises adding to the cheese a substantial quantity of aqueous fluid, heating and homogenizing the same, so as to render it of a relatively thin, smooth and homogeneous consistency, drying the fluid mass thus produced in thin layers, and then comminuting the dried product.

4. That improvement in the art of drying cheese, which comprises adding to the cheese a substantial quantity of aqueous fluid, heating and homogenizing the same, so as to render it of a relatively thin, smooth and homogeneous consistency, at pressures of 3,000 pounds per square inch or more, quickly drying the mass so treated in thin layers at relatively low temperatures of 70° to 130° Fahrenheit, and then comminuting the dried product.

ROBERT ROY IRVIN.